(12) United States Patent
Lindoff et al.

(10) Patent No.: US 10,178,704 B2
(45) Date of Patent: Jan. 8, 2019

(54) METHOD, COMMUNICATION DEVICE AND COMPUTER PROGRAM FOR ENABLING OUT-OF-COVERAGE DEVICE

(71) Applicant: Telefonaktiebolaget L M Ericsson (publ), Stockholm (SE)

(72) Inventors: Bengt Lindoff, Bjarred (SE); Christian Bergljung, Lund (SE); Peter Hedman, Helsingborg (SE); Hakan Palm, Vaxjo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 112 days.

(21) Appl. No.: 14/414,102

(22) PCT Filed: Sep. 26, 2014

(86) PCT No.: PCT/EP2014/070668
§ 371 (c)(1),
(2) Date: Aug. 27, 2015

(87) PCT Pub. No.: WO2016/045745
PCT Pub. Date: Mar. 31, 2016

(65) Prior Publication Data
US 2016/0095144 A1   Mar. 31, 2016

(51) Int. Cl.
*H04W 76/14* (2018.01)
*H04W 24/08* (2009.01)

(52) U.S. Cl.
CPC ........... *H04W 76/14* (2018.02); *H04W 24/08* (2013.01)

(58) Field of Classification Search
CPC .............................. H04W 24/08; H04W 76/023
See application file for complete search history.

(56) References Cited

U.S. PATENT DOCUMENTS

2011/0282989 A1   11/2011   Geirhofer et al.
2014/0204924 A1*   7/2014   Ryu .................... H04W 40/246
                                                                  370/338
(Continued)

FOREIGN PATENT DOCUMENTS

WO   2015/063185 A1   5/2015

OTHER PUBLICATIONS

3GPP TR 22.803 "Feasibility Study for Proximity Services (ProSe)" (Release 12) Version 12.2.0, Jun. 2013, pp. 1-45.
(Continued)

*Primary Examiner* — Andrew Lai
*Assistant Examiner* — M Mostazir Rahman
(74) *Attorney, Agent, or Firm* — Leffler Intellectual Property Law, PLLC

(57) ABSTRACT

A method is disclosed for enabling device-to-device, D2D, communication when a communicating device is out of public land mobile network, PLMN, coverage for a first radio access technology, RAT. The method comprises scanning a carrier associated with a carrier predetermined for D2D communication for any signals, and if the scanning determines that D2D communication is present on the carrier, initiating out-of-coverage D2D communication, or if the scanning cannot determine that D2D communication is present on the carrier, determining a signal strength of other signals on the carrier and if the signal strength is below a threshold initiating out-of-coverage D2D communication. Alternatively, the method comprises scanning a carrier for at least a second RAT, and if a second RAT is detected, determining a PLMN of the detected RAT and accessing data on the determined PLMN about out-of-coverage D2D permissions, and if out-of-coverage D2D communication is permitted in the determined PLMN initiating out-of-cover- (Continued)

age D2D communication. A communication device and computer program accordingly are also disclosed.

13 Claims, 4 Drawing Sheets

(56) References Cited

U.S. PATENT DOCUMENTS

| | | | | |
|---|---|---|---|---|
| 2015/0009949 A1* | 1/2015 | Khoryaev | ............. | H04W 48/16 370/330 |
| 2015/0043448 A1* | 2/2015 | Chatterjee | ............. | H04W 8/005 370/329 |
| 2015/0045018 A1* | 2/2015 | Liu | ........................... | H04L 1/00 455/426.1 |
| 2015/0223141 A1* | 8/2015 | Chatterjee | ........... | H04W 40/246 370/329 |
| 2015/0245394 A1* | 8/2015 | Sharma | ................. | H04W 48/16 455/434 |
| 2015/0281937 A1* | 10/2015 | Li | ........................ | H04W 8/005 370/329 |
| 2016/0183276 A1* | 6/2016 | Marinier | ............... | H04W 72/02 370/329 |
| 2016/0242144 A1* | 8/2016 | Adachi | ................. | H04W 72/04 |

OTHER PUBLICATIONS

PCT International Search Report, dated May 26, 2015, in connection with International Application No. PCT/EP2014070668, all pages.
PCT Written Opinion, dated May 26, 2015, in connection with International Application No. PCT/EP2014070668, all pages.
3GPP TSG-RAN WG2 #85, R2-140787, Prague, Czech-Republic, Feb. 10-14, 2014, Resource coordination for partial coverage, 3 pages.
3GPP TSG-RAN2 #87, R2-143091, Dresden, Germany, Aug. 18-22, 2014, General Dynamics UK Ltd, Resource pool forwarding on the PD2DSCH, 4 pages.
3GPP TSG-RAN WG2 #86, R2-142639, Seoul, Korea, May 19-23, 2014, Partial coverage communication, 3 pages.

* cited by examiner

METHOD, COMMUNICATION DEVICE AND COMPUTER PROGRAM FOR ENABLING OUT-OF-COVERAGE DEVICE

TECHNICAL FIELD

The present invention generally relates to methods of enabling device-to-device network coverage, communication devices having device-to-device communication capabilities, configured to enable device-to-device communication when the communicating device is out of public land mobile network coverage for a first radio access technology, and computer programs for implementing the methods.

BACKGROUND

D2D communications in LTE is currently being specified. A usage scenario for D2D is for National Security, Public Safety (NSPS) and hence the D2D should be able to use both Inside Cellular Network Coverage (IC) as well as Outside Cellular Network Coverage (OoC). Here, in the IC scenario, device is able to properly detect and connect to the cellular network, wherein the network may support by assigning resources for D2D communication, while in the OoC scenario, the device is not able to reliably detect and connect to the cellular network. Different D2D transmission principles, mainly time/frequency resource assignment and receiver behaviour, will be used for IC and OoC respectively. The OoC D2D communication is preferably performed such that it does not interfere with other communication and/or signals. Assuming that a device is configured for OoC D2D communication, and that an OoC situation is determined, there are still issues to handle to avoid interfering with other communication and/or signals.

SUMMARY

The invention is based on the understanding that for initiating OoC D2D communication, all information may not be available for proper avoidance of interfering with other communication or signals. The inventors have found approaches for, in such situations, limiting interfering by making some measurements and taking proper actions in view of the results of the measurements before initiating OoC D2D communication, or omitting OoC D2D communication when the situation is found to require that.

According to a first aspect, there is provided a method of enabling device-to-device, D2D, communication when a communicating device is out of public land mobile network, PLMN, coverage for a first radio access technology, RAT. The method comprises scanning a carrier associated with a carrier predetermined for D2D communication for any signals. If the scanning determines that D2D communication is present on the carrier, the method initiates out-of-coverage D2D communication, or if the scanning cannot determine that D2D communication is present on the carrier, determines a signal strength of other signals on the carrier and if the signal strength is below a threshold the method initiates out-of-coverage D2D communication.

When no D2D communication is present on the carrier and the determined signal strength is above the threshold, the method may comprise scanning a carrier for at least a second RAT, and if a second RAT is detected, determining a PLMN of the detected RAT and accessing data on the determined PLMN about whether out-of-coverage D2D communication is permitted, and if out-of-coverage D2D communication is permitted in the determined PLMN initiating out-of-coverage D2D communication.

According to a second aspect, there is provided a method of enabling device-to-device, D2D, communication when communicating devices are out of public land mobile network, PLMN, coverage for a first radio access technology, RAT. The method comprises scanning a carrier for at least a second RAT. If a second RAT is detected, the method determines a PLMN of the detected RAT and accesses data on the determined PLMN about whether out-of-coverage D2D communication is permitted, and if out-of-coverage D2D communication is permitted in the determined PLMN the method initiates out-of-coverage D2D communication.

If a second RAT is not detected, the method may scan a carrier associated with a carrier predetermined for D2D communication for any signals. If the scanning determines that D2D communication is present on the carrier, the method may initiate out-of-coverage D2D communication, or if the scanning cannot determine that D2D communication is present on the carrier, the method may determine a signal strength of other signals on the carrier and if the signal strength is below a threshold the method initiates out-of-coverage D2D communication.

The following may apply for both the first and second aspects:

The detection of the carrier for the second RAT may comprise detecting a broadcast channel indicating PLMN information.

The data on the determined PLMN about whether out-of-coverage D2D communication is permitted may be accessed from a look-up table indicating regions where out-of-coverage D2D communication is permitted and the determined PLMN is used for determining whether the communication device is present in such a region. The data on the determined PLMN about whether out-of-coverage D2D communication is permitted may indicate frequency and time resources permitted for out-of-coverage D2D communication.

The scanning of the carrier associated with a carrier predetermined for D2D communication may comprise searching for synchronization signals.

The determination that D2D communication is present on the carrier may comprise detecting D2D synchronization signals or scheduling assignment information.

According to a third aspect, there is provided a communication device having device-to-device, D2D, communication capabilities, configured to enable D2D communication when the communicating device is out of public land mobile network, PLMN, coverage for a first radio access technology, RAT. The communication device comprises a D2D communication mechanism arranged to, when the communication device is determined to be out-of-coverage, scan a carrier associated with a carrier predetermined for D2D communication for any signals, and if the scanning determines that D2D communication is present on the carrier, to initiate out-of-coverage D2D communication, or if the scanning cannot determine that D2D communication is present on the carrier, to determine a signal strength of other signals on the carrier and if the signal strength is below a threshold to initiate out-of-coverage D2D communication.

The D2D communication mechanism may be arranged to, when no D2D communication is present on the carrier and the determined signal strength is above the threshold, scan a carrier for at least a second RAT, and if a second RAT is detected, to determine a PLMN of the detected RAT and to access data on the determined PLMN whether about out-of-coverage D2D communication is permitted, and if outof-coverage D2D communication is permitted in the determined PLMN, to initiate out-of-coverage D2D communication.

According to a fourth aspect, there is provided a communication device having device-to-device, D2D, communication capabilities, configured to enable D2D communication when the communicating device is out of public land mobile network, PLMN, coverage for a first radio access technology, RAT. The communication device comprises a D2D communication mechanism arranged to, when the communication device is determined to be out-of-coverage, scan a carrier for at least a second RAT, and if a second RAT is detected, to determine a PLMN of the detected RAT and to access data on the determined PLMN about whether out-of-coverage D2D communication is permitted, and if out-of-coverage D2D communication is permitted in the determined PLMN to initiate out-of-coverage D2D communication.

The D2D communication mechanism may be arranged to, if a second RAT is not detected, scan a carrier, associated with a carrier predetermined for D2D communication, for any signals, and if the scan determines that D2D communication is present on the carrier, to initiate out-of-coverage D2D communication, or if the scan cannot determine that D2D communication is present on the carrier, to determine a signal strength of other signals on the carrier and if the signal strength is below a threshold to initiate out-of-coverage D2D communication.

The following may apply to both of the third and fourth aspects:

The detection of the carrier for the second RAT may comprise detection of a broadcast channel indicating PLMN information.

The data on the determined PLMN about whether out-of-coverage D2D communication is permitted may be arranged to be accessed from a look-up table indicating regions where out-of-coverage D2D communication is permitted and the determined PLMN is used for determination whether the communication device is present in such a region. The data on the determined PLMN about whether out-of-coverage D2D communication is permitted may indicate frequency and time resources permitted for out-of-coverage D2D communication.

The scan of the carrier associated with a carrier predetermined for D2D communication may comprise a search for synchronization signals.

The determination that D2D communication is present on the carrier may comprise detection of D2D synchronization signals or scheduling assignment information.

According to a fifth aspect, there is provided a computer program comprising instructions which, when executed on a processor of a communication apparatus, causes the communication apparatus to perform the method according to the first or second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
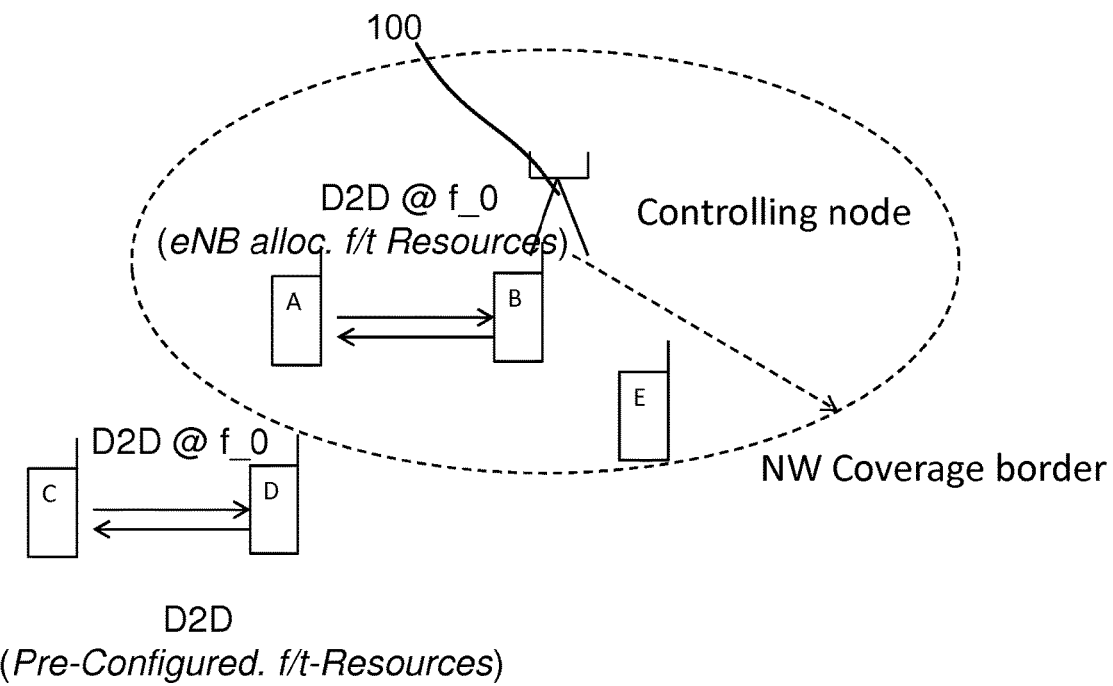
FIG. 1 schematically illustrates principles for D2D communication.

Some Abbreviations
  3GPP $3^{rd}$ Generation Partnership Project
  LTE Long Term Evolution
  GSM Global System for Mobile communications
  EDGE Enhanced Data rates for GSM Evolution
  WCDMA Wideband Code Division Multiple Access
  HSPA High-Speed Packet Access
  TD-SCDMA Time Division Synchronous Code Division Multiple Access
  WLAN Wireless Local Area Network
  RAT Radio Access Technology
  FDD Frequency Division Duplex
  TDD Time Division Duplex
  UL Uplink
  DL Downlink
  PDCCH Physical Downlink Control Channel
  PSS Primary Synchronization Signal
  SSS Secondary Synchronization Signal
  BLER Block Error Rate
  ME Mobile Equipment
  NW Network
  OMA Open Mobile Alliance
  DM Device Management
  RRC Radio Resource Controller
  SIR Signal-to-Interference Ratio
  SINR Signal-to-Interference-and-Noise-Ratio
  CRS Cell-specific (common) Reference Signal
  PHICH Physical Hybrid-ARQ Indicator Channel
  PCFICH Physical Format Indicator Channel
  SIM Subscriber Identification Module
  TX Transmitter
  RX Receiver
  TRX Transceiver
  UE User Equipment
  UICC Universal Integrated Circuit Card
  SIM Subscriber Identity Module
  MIB Master Information Block
  SIB System Information Block
  RSRP Reference Signal Received Power
  RSSI Received Signal Strength Indicator
  PLMN Public Land Mobile Network Other abbreviations are explained as they appear throughout the text.

Although the idea of enabling D2D communications as a means of relaying in cellular networks was proposed by some early works on ad hoc networks, the concept of allowing local D2D communications to (re)use cellular spectrum resources simultaneously with on-going cellular traffic is relatively recently addressed. Because the non-orthogonal resource sharing between the cellular and the D2D layers has the potential of the reuse gain and proximity gain at the same time increasing the resource utilization, D2D communications underlying cellular networks has received considerable interest in the recent years.

Specifically, in 3GPP LTE networks, such LTE Direct, i.e. D2D, communication can be used in commercial applications, such as cellular network offloading, proximity based social networking, or in public safety situations in which first responders need to communicate with each other and with people in the disaster area, which is addressed in the feasibility study of 3GPP TR 22.803.

D2D communication entities using an LTE Direct link may reuse the same physical resource blocks (PRB), i.e. frequency/time (f/t) resources, as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D, i.e. LTE Direct, communications takes place in the cellular DL spectrum or in DL time slots. For ease of presentation, in the present disclosure we assume that D2D links use uplink resources, such as uplink PRBs in an FDD or uplink time slots in an a cellular TDD system, but the main ideas would carry over to cases in which D2D communications take place in DL spectrum as well.

FIG. 1 shows the principles for D2D communication within LTE. A controlling node 100, i.e. eNode B or Cluster Head, i.e. a UE performing controlling node tasks, is controlling the communication on a frequency carrier f_0. In a first scenario, devices A and B are communicating directly via a D2D link, and both devices are inside NW coverage of the controlling node. The controlling node then allocates the radio resources to use for D2D communication for D2D. In the second scenario at least one of devices C and D may have D2D communication outside any controlling node coverage. In this case the D2D communication is using pre-configured (by standard or by device capabilities for instance) f/t-resources for D2D communication. The pre-configuration may for example be defined in the device, e.g. in the UICC, defined by information in the SIM-card (subscription), pre-configured in the ME at manufacturing, or using any pro-visioning method such as OMA DM. Since the pre-configured resources may be used by other devices inside controlling node coverage, say device E communicating with controlling node, the D2D communication between devices C and D may start to interfere with the communication between device E and the controlling node, if devices C and D are coming into the controlling node coverage. A device detects whether it is coming inside network coverage on a controlled way in order to minimize the risk for interference. Approaches for determining whether being in or out of coverage are for example demonstrated in U.S. patent application 61/898,084, which is hereby incorporated by reference.

As discussed above, a D2D enabled NSPS device is allowed to transmit on certain pre-configured resources in the UL spectrum when the device is out of NW node coverage. In Release 12 of 3GPP LTE, a UE is considered in-coverage if it has a serving cell, i.e. when CONNECTED, or is camping on a cell, i.e. when IDLE. Furthermore, at least in the IDLE state, in-coverage and out-of-coverage is mapped to a DL metric, which may be from system information detection like RSRP or possibility to read relevant MIB/SIBs. If this is not fulfilled, the device/UE may be considered to be out-of-coverage.

NSPS functionality and authority is typically something with geographical constraints. Hence, in a typical scenario the NSPS authority, i.e. with respect to regions and frequency bands allowed, is (hard)coded in the UE, and the device need to follow that restrictions. However in a roaming scenario, where the NSPS device is turned on and the home PLMN (or any PLMN) is not detected on the registered (on the SIM card) NSPS band, the device may, using prior art principles, enable D2D transmission on the pre-configured resources. However, at this location, the spectrum allocated to D2D may be used by other RATs or by other radio transmissions schemes, e.g. Radar etc., which might be severely interfered by the D2D transmission.

For example, in case no LTE DL signal transmitted from a network node (such as an eNode B) is detected on the DL resources associated with the UL resources used for D2D transmission on pre-configured resources, the device scans the UL resources for potential transmissions. In case any D2D transmissions are detected, confirming the use of D2D in the UL resources, the device is allowed to enable D2D transmissions on pre-configured resources. In case of no signal at all detected, e.g. when RSSI<pre-defined threshold, over a pre-defined first time interval, it is also an indication that no interfering signals is present, and D2D transmissions are allowed and/or feasible.

In another example, in case no LTE DL signal detected on the DL resources associated with the UL resources used for D2D transmission on pre-configured resources, the device scans at least one other carrier frequency for any RAT, e.g. 2G/3G/4G/WLAN, which the device is configured to be able to receive, and once a RAT is detected, the device reads the PLMN information and by using for instance a look-up table it gets an indication about the current region/geographical area. Based on that information and the stored information in the UE, e.g. in the UICC or ME, the device knows whether it is allowed to do D2D transmission on the pre-configured resources.

The two examples given above may be combined by applying either principle first, and upon failure to initiate D2D communication with that, applying the other principle, which is further elucidated below.

The general aim is to enable D2D communication in OoC/no coverage situations, particularly in case of a roaming scenario. This provides for avoiding at least to some degree D2D-to-other system interference.

Figure 2:
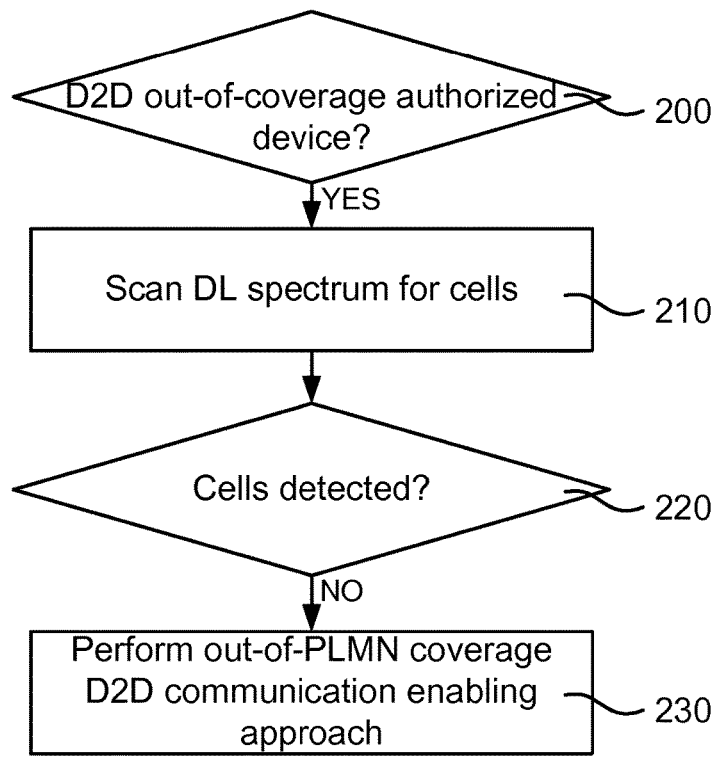
FIG. 2 is a flow chart illustrating a method according to an embodiment.

FIG. 2 is a flow chart illustrating a method of an embodiment. A device/UE is presumed authorized 200 for use of D2D communication out-of-NW coverage within an LTE carrier frequency/frequency band in a certain region. If not, OoC D2D communication is inherently not feasible. The device may be an NSPS device and the region may be a country, but not limited to. The information about which (pre-configured) spectrum resources to use as well where the device is authorized to do D2D communication out-of-coverage may be stored on a UICC or in the ME. The device scans 210 the DL spectrum associated to the UL spectrum where D2D communication is allowed, in order to find a suitable cell to camp on using well known cell search techniques. A control unit determines whether a cell has been detected 220, for instance by reliable detection of CRS:s, e.g. if RSRP>threshold, or reliable detection of relevant MIB/SIBs. If no cell is detected, an OoC D2D communication enabling approach is performed 230. Below, some embodiments of that approach that may be envisioned are demonstrated. If a cell is detected 230, a conventional approach for handling D2D communication is applied.

Figure 3:
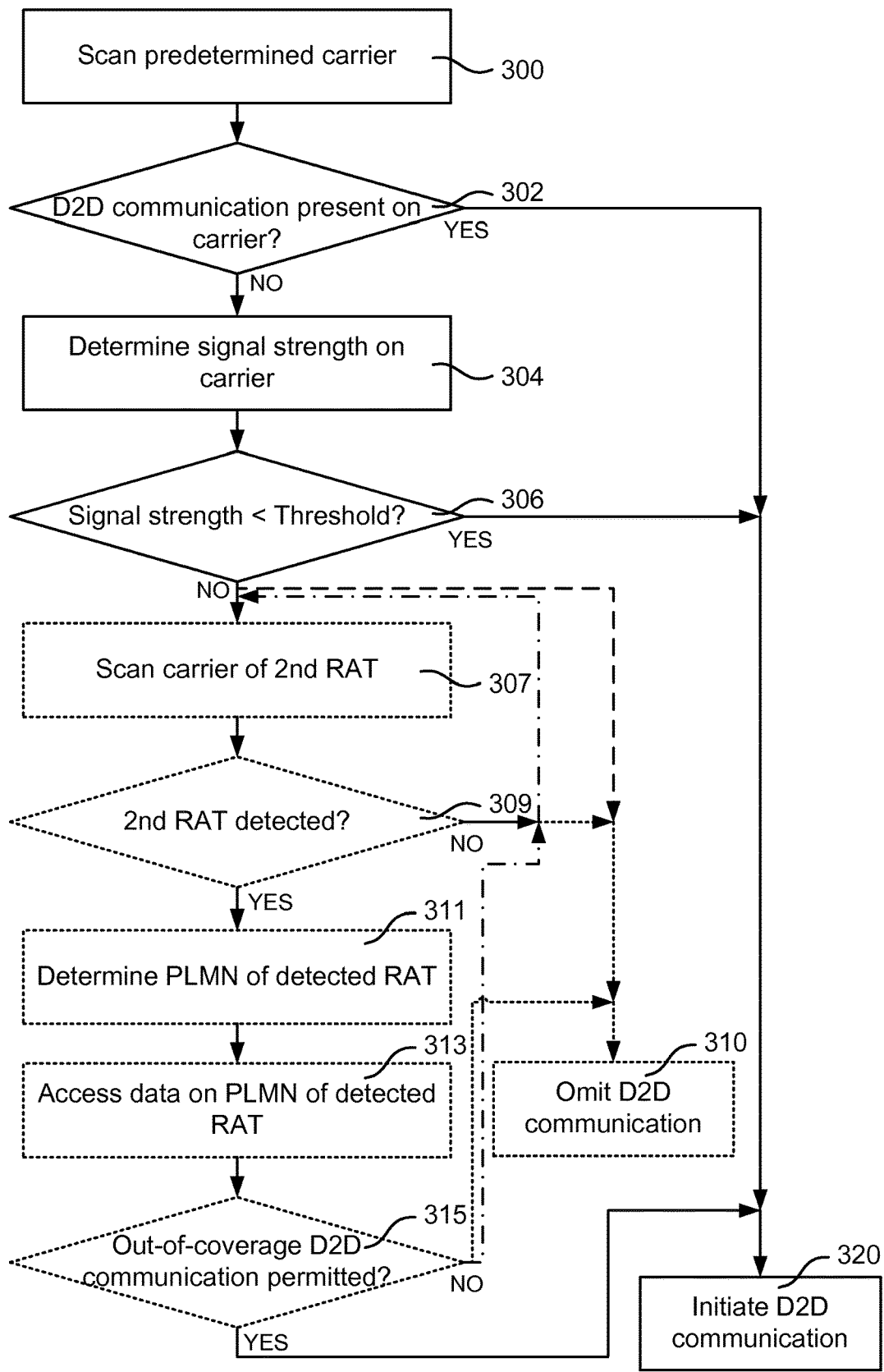
FIG. 3 is a flow chart illustrating a method according to an embodiment.

FIG. 3 is a flow chart illustrating a method of embodiments of an OoC D2D communication enabling approach. A device scans 200 a predetermined carrier, which for example may be an LTE DL signal detected on DL resources associated with UL resources used for D2D transmission. These are for example allocated on pre-configured resources. This is for checking if the predetermined carrier really is suitable for D2D communication. It is checked 302 whether there is D2D communication already present on the carrier. In such case, the presumption is made that D2D communication is allowed, and the method proceeds with initiating D2D communication 320. In case no D2D communication is found, the method instead proceeds with determining 304 signal strength on the carrier, and if the signal strength is determined 306 to be below a threshold, the presumption is made that D2D communication is feasible, i.e. will not interfere with other systems, and D2D communication is initiated 320. The threshold may be set to a value chosen such that some degree of certainty that there is no signal on the carrier that may be interfered by the potential D2D communication. For example, the threshold may be set to −80 dBm.

Here, it is readily understood from the above described approach that the check 304, 306 on signal strength may equally be performed before the check 302 whether any D2D communication is present, or they may be performed in parallel.

In case there is no D2D communication but the signal strength reaches the threshold, it is not suitable to establish D2D communication, and the method may proceed to some "omit D2D communication" decision step 310, as indicated by hashed arrow. Alternatively, the method proceeds with scanning 307 a carrier of a $2^{nd}$ RAT. This may for example be another RAT allowing D2D communication under certain circumstances. Examples of other RATs are 2G/3G/4G/WLAN wireless and/or cellular communication systems, which the device may be configured to be able to receive signals from. If such a second RAT is detected 309, the device reads 311 PLMN information accordingly, and accesses 313 data on the PLMN, e.g. by using a look-up table, to get an indication about the current region/geographical area. Based on that information and the stored information in the UE, e.g. in the UICC or ME, the device knows whether it is allowed to do D2D transmission on the pre-configured resources. If it is determined 315 that OoC D2D communication is permitted, the method proceeds with initiating 320 D2D communication.

For the case that the $2^{nd}$ RAT is not detected 309, the method may proceed to the omit D2D communication step 310, as indicated by hashed arrow. Alternatively, the method may proceed by carrier scanning 307 for another RAT, as indicated by dot-dashed arrow. If the accessed data on the PLMN indicates 315 that no OoC D2D communication is permitted, the method may proceed to the omit D2D communication step 310, as indicated by hashed arrow. Alternatively, the method may proceed by carrier scanning 307 for another RAT, as indicated by dot-dashed arrow.

Figure 4:
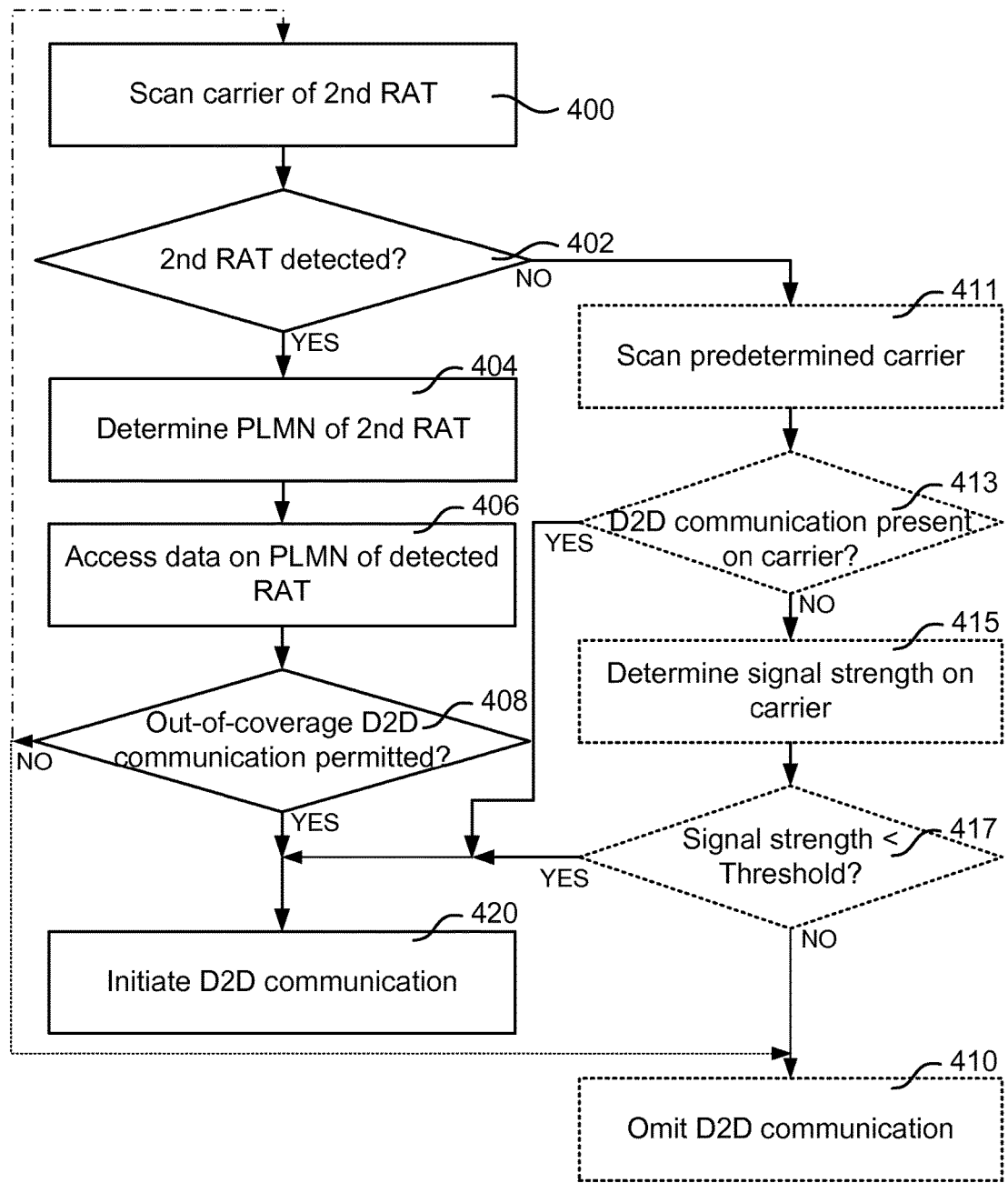
FIG. 4 is a flow chart illustrating a method according to an embodiment.

FIG. 4 is a flow chart illustrating a method of embodiments of an OoC D2D communication enabling approach. A device scans 400 a carrier of a $2^{nd}$ RAT. This may for example be another RAT allowing D2D communication under certain circumstances. Examples of other RATs are 2G/3G/4G/WLAN wireless and/or cellular communication systems, which the device may be configured to be able to receive signals from. If such a second RAT is detected 402, the device reads 404 PLMN information accordingly, and accesses 406 data on the PLMN, e.g. by using a look-up table, to get an indication about the current region/geographical area. Based on that information and the stored information in the UE, e.g. in the UICC or ME, the device knows whether it is allowed to do D2D transmission on the pre-configured resources. If it is determined 408 that OoC D2D communication is permitted, the method proceeds with initiating 420 D2D communication.

For the case that the $2^{nd}$ RAT is not detected 402, the method may proceed to scan 411 a predetermined carrier, which for example may be an LTE DL signal detected on DL resources associated with UL resources used for D2D transmission. These are for example allocated on pre-configured resources. This is for checking if the predetermined carrier really is suitable for D2D communication. It is checked 413 whether there is D2D communication already present on the carrier. In such case, the presumption is made that D2D communication is allowed, and the method proceeds with initiating D2D communication 420. In case no D2D communication is found, the method instead proceeds with determining 415 signal strength on the carrier, and if the signal strength is determined 417 to be below a threshold, the presumption is made that D2D communication is feasible, i.e. will not interfere with other systems, and D2D communication is initiated 420.

Here, it is readily understood from the above described approach that the check 415, 417 on signal strength may equally be performed before the check 413 whether any D2D communication is present, or they may be performed in parallel.

For the case that the method cannot proceed to the D2D communication initiation step 420 by the checks 413, 417 demonstrated above, the method proceeds to a step of deciding 410 to omit D2D communication.

Further, if it is determined 408 that OoC D2D communication is not permitted under the $2^{nd}$ RAT, the method may proceed (hashed arrow) to the step of deciding 410 to omit D2D communication. Alternatively, upon the determination 408 that OoC D2D communication is not permitted under the $2^{nd}$ RAT, the method may return (dot-dashed arrow) to scan 400 a carrier of another $2^{nd}$ RAT, and then proceed according to what is demonstrated above for any such detected 402 RAT.

The scanning 300, 411 may for example comprise searching for synchronization signals, such as PSS/SSS in e.g. 3GPP LTE. Similar, the determination 302, 413 whether D2D communication is present may comprise detecting synchronization signals, such as D2DPSS/D2DSSS in e.g. 3GPP LTE, or scheduling assignment information associated with D2D communication. The detection 309, 402 of the $2^{nd}$ RAT may comprise detecting broadcast information, i.e. searching for a broadcast channel for the respective RAT that is scanned 307, 400 for. The determining 315, 408 whether OoC D2D communication is permitted, and the resources (f/t) allocated when permitted, may be made by accessing look-up tables of regions where this is allowed, which is checked with the detected and accessed PLMN data. Thereby, it may be determined both if and how D2D communication can be initiated for those cases.

In brief, the approaches demonstrated with reference to FIGS. 3 and 4 are inclined to look for possibilities to perform D2D communication by either checking a predetermined carrier or checking if a $2^{nd}$ RAT permits D2D communication. Both the approaches may comprise, if the primary look for possibilities to perform D2D communication, as an alternative to try the other approach consecutively, as demonstrated above.

Figure 5:
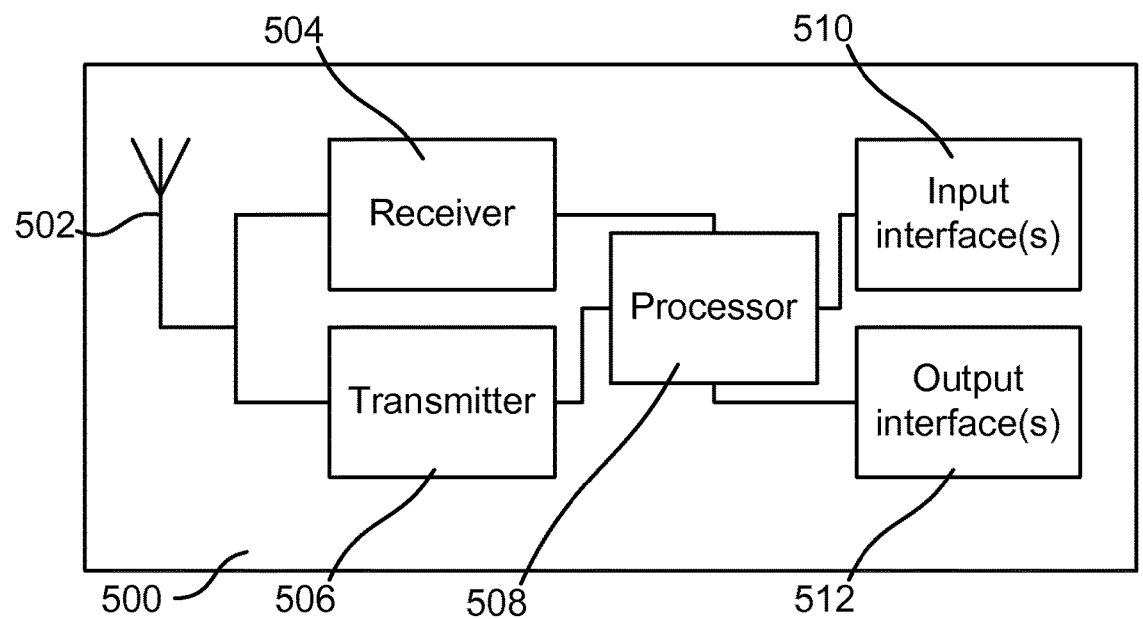
FIG. 5 is a block diagram schematically illustrating a UE 700 according to an embodiment.

FIG. 5 is a block diagram schematically illustrating a UE 500 according to an embodiment. The UE comprises an antenna arrangement 502, a receiver 504 connected to the antenna arrangement 502, a transmitter 506 connected to the antenna arrangement 502, a processing element 508 which may comprise one or more circuits, one or more input interfaces 510 and one or more output interfaces 512. The interfaces 510, 512 can be user interfaces and/or signal interfaces, e.g. electrical or optical. The UE 500 is arranged to operate in a cellular communication network. In particular, by the processing element 508 being arranged to perform the embodiments demonstrated with reference to FIGS. 1 to 4, the UE 500 is capable of OoC D2D communication such that, at least to some degree, D2D-to-other system interference is avoided. The processing element 508 can also fulfill a multitude of tasks, ranging from signal processing to enable reception and transmission since it is connected to the receiver 504 and transmitter 506, executing applications, controlling the interfaces 510, 512, etc.

Figure 6:
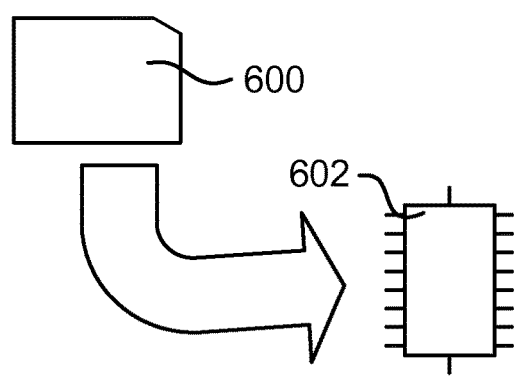
FIG. 6 schematically illustrates a computer-readable medium and a processing device.

The methods according to the present invention is suitable for implementation with aid of processing means, such as computers and/or processors, especially for the case where the processing element 508 demonstrated above comprises a processor handling the OoC D2D communication enabling approach. Therefore, there is provided computer programs, comprising instructions arranged to cause the processing means, processor, or computer to perform the steps of any of the methods according to any of the embodiments described with reference to FIGS. 2 to 4. The computer programs preferably comprises program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIGS. 2 to 4. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

The invention claimed is:

1. A method of enabling device-to-device (D2D) communication when a communicating device is out of public land mobile network (PLMN) coverage for a first radio access technology (RAT), the method comprising:
the communicating device performing:
detecting that the communication device is out of PLMN coverage for the first RAT, and in response thereto, initiating out-of-coverage D2D communication only after first estimating that the out-of-coverage D2D communication will not cause interference in a communication system that uses at least a second RAT,
wherein initiating the out-of-coverage D2D communication only after first estimating that the out-of-coverage D2D communication will not cause interference in the communication system that uses at least the second RAT comprises:
scanning a carrier associated with a carrier predetermined for D2D-type communication for any signals;
if the scanning determines that other D2D communication is present on the carrier, initiating the out-of-coverage D2D communication;
if the scanning cannot determine that other D2D communication is present on the carrier, determining a signal strength of other signals on the carrier and if the signal strength of the other signals is below a threshold initiating the out-of-coverage D2D communication; and when no other D2D communication is present on the carrier and the determined signal strength is above the threshold, performing:
scanning an other carrier for at least the second RAT; and
if the second RAT is detected, determining a PLMN of the detected second RAT and accessing data on the determined PLMN of the detected second RAT about whether or not out-of-coverage D2D communication by devices within a coverage area of the PLMN of the detected second RAT is permitted, and if the out-of-coverage D2D communication by devices within the coverage area of the PLMN of the detected second RAT is permitted in the determined PLMN of the detected second RAT, initiating the out-of-coverage D2D communication.

2. The method of claim 1, wherein the detection of the other carrier for the second RAT comprises detecting a broadcast channel indicating PLMN information.

3. The method of claim 1, wherein the data on the determined PLMN of the detected second RAT about whether the out-of-coverage D2D communication 12y devices within the coverage area of the PLMN of the detected second RAT is permitted is accessed from a look-up table indicating regions where out-of-coverage D2D-type communication is permitted and the determined PLMN of the detected second RAT is used for determining whether the communication device is present in such a region.

4. The method of claim 3, wherein the data on the determined PLMN of the detected second RAT about out-of-coverage D2D-type communication permissions indicates frequency or time resources permitted for out-of-coverage D2D-type communication.

5. The method of claim 1, wherein the scanning of the carrier associated with the carrier predetermined for D2D-type communication comprises searching for synchronization signals.

6. The method of claim 1, wherein the determination that other D2D communication is present on the carrier comprises detecting D2D synchronization signals or scheduling assignment information.

7. A communication device having device-to-device (D2D) communication capabilities, configured to enable D2D communication when the communicating device is out of public land mobile network (PLMN) coverage for a first radio access technology (RAT) and comprising:
a controller configured to determine that the communication device is out of PLMN coverage for the first RAT; and
a D2D communication mechanism arranged to respond to the controller determining that the communication device is out-of-coverage by initiating out-of-coverage D2D communication only after first estimating that the out-of-coverage D2D communication will not cause interference in a communication system that uses at least a second RAT,
wherein initiating the out-of-coverage D2D communication only after first estimating that the out-of-coverage D2D communication will not cause interference in the communication system that uses at least the second RAT comprises:
scanning for presence of any signals on a carrier that is associated with a carrier predetermined for D2D-type communication,
initiating the out-of-coverage D2D communication if the scanning determines that other D2D communication is present on the carrier, determining a signal strength of other signals on the carrier if the scanning cannot determine that other D2D communication is present on the carrier, and initiating the out-of-coverage D2D communication if the determined signal strength is below a signal strength threshold; and when no other D2D communication is present on the carrier and the determined signal strength is above the signal strength threshold, performing:

scanning an other carrier for at least the second RAT; and if the second RAT is detected, determining a PLMN of the detected second RAT and accessing data on the determined PLMN of the detected second RAT about whether or not out-of-coverage D2D communication by devices within a coverage area of the PLMN of the detected second RAT is permitted, and if the out-of-coverage D2D communication by devices within the coverage area of the PLMN of the detected second RAT is permitted in the determined PLMN of the detected second RAT, initiating the out-of-coverage D2D communication.

8. The communication device of claim 7, wherein the detection of the other carrier for the second RAT comprises detection of a broadcast channel indicating PLMN information.

9. The communication device of claim 7, wherein the data on the determined PLMN of the detected second RAT about whether the out-of-coverage D2D communication by devices within the coverage area of the PLMN of the detected second RAT is permitted is arranged to be accessed from a look-up table indicating regions where out-of-coverage D2D-type communication is permitted and the determined PLMN of the detected second RAT is used for determination whether the communication device is present in such a region.

10. The communication device of claim 9, wherein the data on the determined PLMN of the detected second RAT about whether out-of-coverage D2D-type communication is permitted indicates frequency and time resources permitted for out-of-coverage D2D-type communication.

11. The communication device of claim 7, wherein the scan of the carrier associated with the carrier predetermined for D2D-type communication comprises a search for synchronization signals.

12. The communication device of claim 7, wherein the determination that other D2D communication is present on the carrier comprises detection of D2D synchronization signals or scheduling assignment information.

13. A non-transitory processor-readable storage medium comprising instructions which, when executed on a processor of a communicating device, causes the communicating device to perform a method of enabling device-to-device (D2D) communication when the communicating device is out of public land mobile network (PLMN) coverage for a first radio access technology (RAT), the method comprising:

detecting that the communicating device is out of PLMN coverage for the first RAT, and in response thereto, initiating out-of-coverage D2D communication only after first estimating that the out-of-coverage D2D communication will not cause interference in a communication system that uses at least a second RAT, wherein initiating the out-of-coverage D2D communication only after first estimating that the out-of-coverage D2D communication will not cause interference in the communication system that uses at least the second RAT comprises:

scanning a carrier associated with a carrier predetermined for D2D-type communication for any signals;

if the scanning determines that other D2D communication is present on the carrier, initiating the out-of-coverage D2D communication;

if the scanning cannot determine that other D2D communication is present on the carrier, determining a signal strength of other signals on the carrier and if the signal strength of the other signals is below a threshold initiating the out-of-coverage D2D communication; and when no other D2D communication is present on the carrier and the determined signal strength is above the threshold, performing:

scanning an other carrier for at least the second RAT; and if the second RAT is detected, determining a PLMN of the detected second RAT and accessing data on the determined PLMN of the detected second RAT about whether or not out-of-coverage D2D communication by devices within a coverage area of the PLMN of the detected second RAT is permitted, and if the out-of-coverage D2D communication by devices within the coverage area of the PLMN of the detected second RAT is permitted in the determined PLMN of the detected second RAT, initiating the out-of-coverage D2D communication.

* * * * *